(12) United States Patent
Liao et al.

(10) Patent No.: US 6,653,635 B2
(45) Date of Patent: Nov. 25, 2003

(54) DETECTOR WITH WIDE DETECTING RANGE AND METHOD OF EXTENDING THE DETECTING RANGE

(75) Inventors: Shin Hua Liao, Hsin Tien (TW); Chi Yu Lee, Hsin Tien (TW); Wen Chin Chen, Hsin Tien (TW)

(73) Assignee: Interquartz (Malaysia) BHD. Representative Office, Taipei Hsien (TW)

( * ) Notice: Subject to any disclaimer, the term of this patent is extended or adjusted under 35 U.S.C. 154(b) by 248 days.

(21) Appl. No.: 09/841,121

(22) Filed: Apr. 25, 2001

(65) Prior Publication Data

US 2002/0158204 A1 Oct. 31, 2002

(51) Int. Cl.[7] .................................................. G01J 5/08
(52) U.S. Cl. ................................. 250/353; 250/DIG. 1
(58) Field of Search .............................. 250/353, 338.1, 250/336.1, DIG. 1

(56) References Cited

U.S. PATENT DOCUMENTS 5,103,346 A * 4/1992 Chang ........................ 359/855

6,211,522 B1 * 4/2001 Kotlicki et al. ............. 250/353

* cited by examiner

*Primary Examiner*—David Porta
*Assistant Examiner*—Christine Sung
(74) *Attorney, Agent, or Firm*—Troxell Law Office PLLC

(57) ABSTRACT

A detector with a wide detecting range having a module of electrical circuit boards including an infrared radiation detector element; a stacked-up multifaceted arc lens assembly installed in front of the detector element which is located at the focus of the arc lens assembly to receive the focused infrared rays; and a single deflector plate conjoined to the detector element and mounted on the electrical circuit board, the signal deflector plate having symmetrically constructed reflecting units. Each reflecting unit is composed of a least two reflection planes. The invention is capable of covering detection blind zone exceeding 60 degrees both in right and left directions of the central axis of the detector element, thereby achieving a wide detecting range of over 200 degrees. A method of extending the detecting range is also taught.

9 Claims, 12 Drawing Sheets

| Infrared rays, Sx | α for Ec | Reflection plane | β | Detection angle |
|---|---|---|---|---|
| S3 | 37° | 51 | β3= 64° | 128° |
| S4 | 36° | 50 | β4= 76° | 152° |
| S5 | 35° | 52 | β5= 90° | 180° |
| S6 | 37° | 53 | β6= 107° | 214° |

α : Angle between Sx with reflection plane

FIG.8C

Angle of α corresponding to S6 & reflection plane 53

| Infrared rays, Sx | α for Ed | Reflection plane | β | Detection angle |
|---|---|---|---|---|
| S3' | 37° | 51 | β3 = 64° | 128° |
| S4' | 36° | 50 | β4 = 76° | 152° |
| S5' | 35° | 52 | β5 = 90° | 180° |
| S6' | 37° | 53 | β6 = 107° | 214° |

α : Angle between Sx with reflection plane

FIG.9C

DETECTOR WITH WIDE DETECTING RANGE AND METHOD OF EXTENDING THE DETECTING RANGE

BACKGROUND OF THE INVENTION

1.) Field of the Invention

The present invention relates generally to an infrared radiation detector. In particular, it relates to a detector, incorporated with a stacked-up multifaceted arc lens assembly and a deflector plate, with a detecting range beyond 120 degrees, as well as a method of extending the detecting range.

2.) Description of the Prior Art

Generally, an infrared radiation detector is used in a security system, a temperature sensing system, a dimmer control system, and other automatic monitoring and control systems. For example, in a security system, an infrared radiation detector is employed in a high rise building monitoring and control arrangement to detect the infrared ray emitted by an intruder or intruders, thereby actuating an alarm circuit or performing other relevant functions.

A common detecting range for prior art infrared radiation detectors is approximately from 110 degrees to 120 degrees, giving rise to a detection blind zone beyond 120 degrees. A prior art infrared radiation detector is normally wall- or eave- or ceiling-mounted. In that connection, there will be a detection blind zone, especially at wall corners or extremities. This blind zone is enlarged in proportion to the increase in surveillance spacing. To cope with this blind zone problem, several proposals had been taught. Nally Chang disclosed in U.S. Pat. No. 5,103,346 a detecting range of larger than 120 degrees with the assistance of right and left deflector surfaces provide on each side of signal deflector plate in front of a signal-receiving detector. FIG. 1 illustrates a schematic view of the detecting range according to Chang's case. Upon further investigation, it was found that the above-mentioned detector was not responsive between 70 degrees to 80 degrees from the central axis of a signal-receiving detector, resulting in a detection blind zone at A1 region.

Other relevant prior art cases include U.S. Pat. No. 3,923,382 (Harding), U.S. Pat. No. 4,268,752 (Herwig), U.S. Pat. No. 4,644,147 (Zublin), U.S. Pat. No. 4,703,171 (Kahl et al).

SUMMARY OF THE INVENTION

A primary object of the present invention is to overcome the above detection blind zone of the prior art detectors.

Accordingly, the present invention discloses an incorporation of a stacked-up multifaceted arc lens assembly and a deflector plate to an infrared radiation detector. In a preferred embodiment of the invention, at least two reflection planes are integrally provided on each side of a signal deflector plate, and a stacked-up arc lens assembly has two stacked up broad lenses at either side of a central focusing zone to gather and focus more incident infrared rays from a wider detection range.

The invention will be described further in one preferred embodiment of the invention, by way of example, with reference to the drawings appended below.

BRIEF DESCRIPTION OF THE DRAWINGS

FIG. 8C shows a tabulation of the glancing angles of incident rays as well as detection angles and ranges of the invention shown in FIG. 8A.

FIG. 9C shows a tabulation of the glancing angles of incident rays as well as detection angles and ranges of the invention shown in FIG. 9A.

DETAILED DESCRIPTION OF A PREFERRED EMBODIMENT

Figures 2, 3:
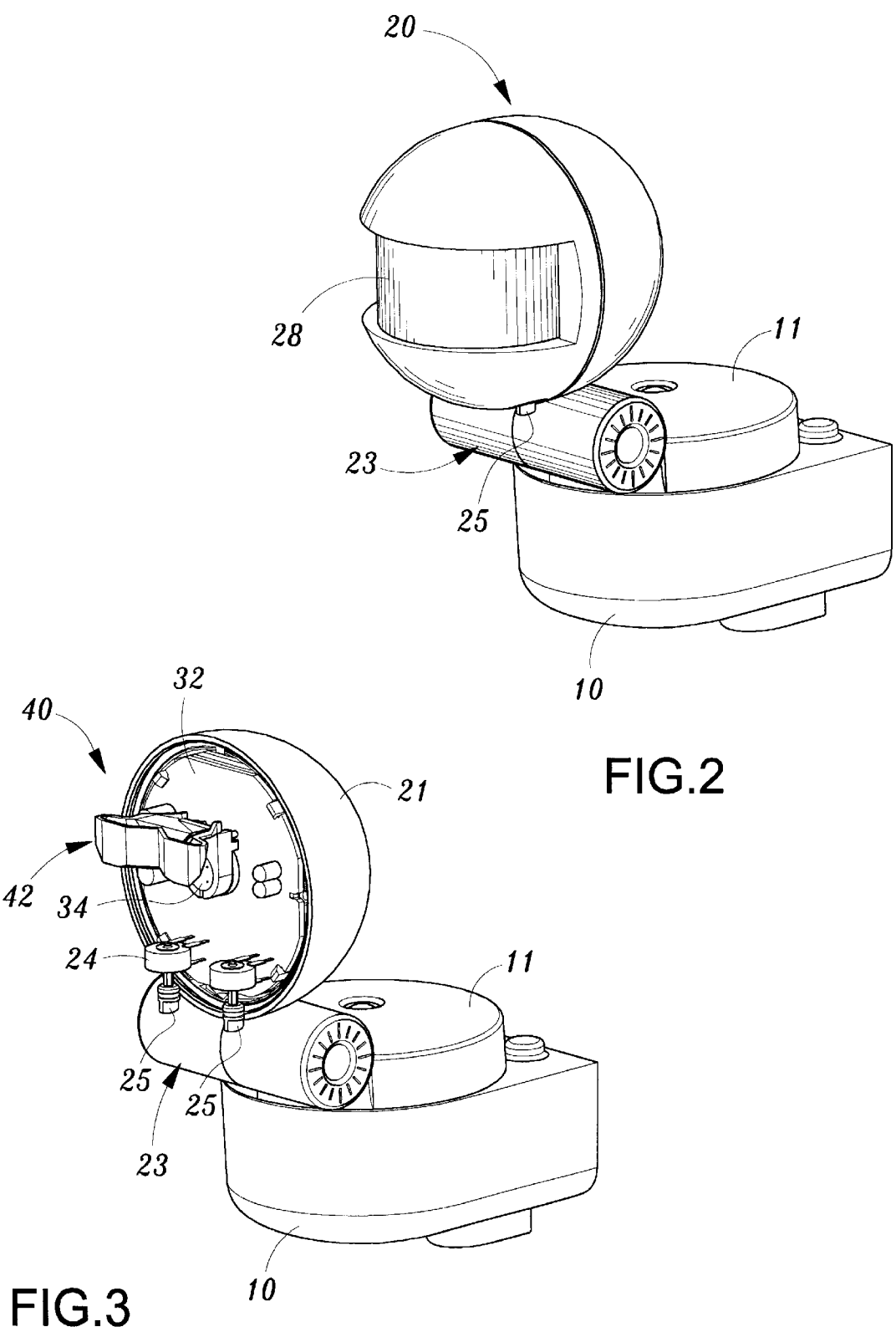
FIG. 2 is a perspective view of one preferred embodiment of the present invention, fully assembled.
FIG. 3 is a perspective view of one preferred embodiment of the present invention, with its face plate removed.
Figure 4:
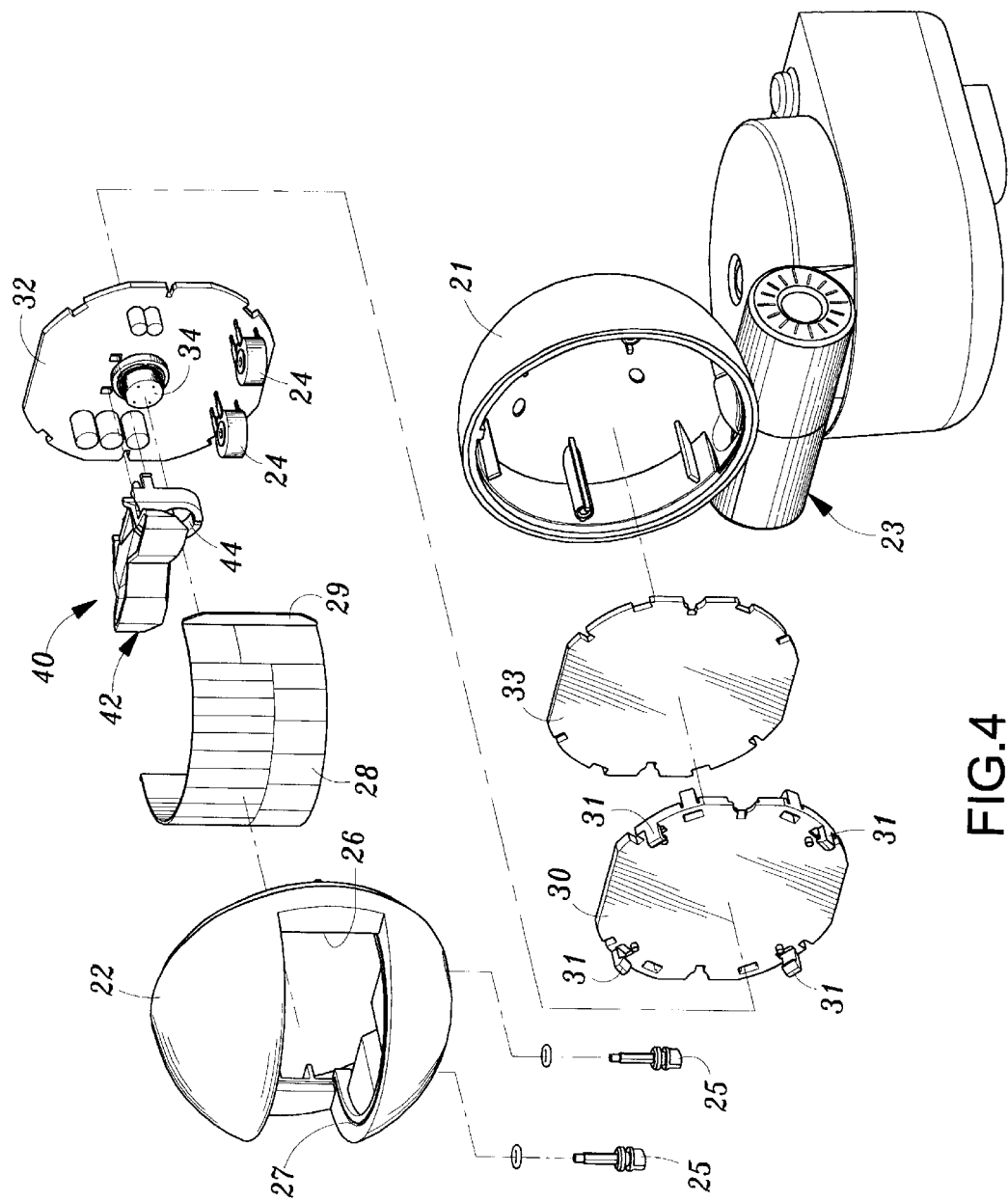
FIG. 4 is an assembly view of the embodiment shown in FIG. 2.

Referring simultaneously to FIGS. 2 to 4, a preferred embodiment of the infrared radiation detector of the present invention comprises essentially a stationary base 10, a spherical body 20, and a rotating mechanism 23 intermediately disposed between the base 10 and the spherical body 20.

The base 10 has a pivot (not shown) for inserting a sleeve 11 therein, so that the sleeve 11 is rotatable horizontally about the pivot. The intermediate rotating mechanism 23 makes the spherical body 20 rotatable about the central axis of the mechanism 23, in a vertical plane. With these actions, the detector is adjustable to a most favorable position for signal detection.

The spherical body 20 includes a housing 21 and a face plate 22. The housing 21 accommodates a supporting plate 30. On the circumferential fringe of the supporting plate 30, a plurality of hooks 31 is stretched out alternately on either side. A first circuit board 32 is thus fixed onto the forward looking side of the supporting plate 30, whereas a second circuit board 33 is fixed onto the backward looking side of the supporting plate 30.

The components for a detecting and processing circuit for the detector are mounted on the first and the second circuit boards 32 and 33. The detecting and processing circuit includes an infrared radiation detector element 34 of any known thermal electric type, and two circuit adjusting devices 24. The circuit adjusting devices 24 are disposed on the first circuit board 32 with two adjusting screws 25 disposed at the bottom of the face plate 22. The adjusting screws 25 are employed to test or adjust the circuit on the first circuit board 32 when required. A deflector plate 40 is disposed in front of the detector element 34.

The face plate 22 is provided with a window 26 having a groove 27 along its lower edge. An arc lens assembly 28 is affixed to the window 26, attaching the side fringe 29 of the assembly 28 to the vertical edge of the window 26. The detector element 34 is disposed at the focal point of the assembly 28. The focal length is 31 mm.

Figure 5A:
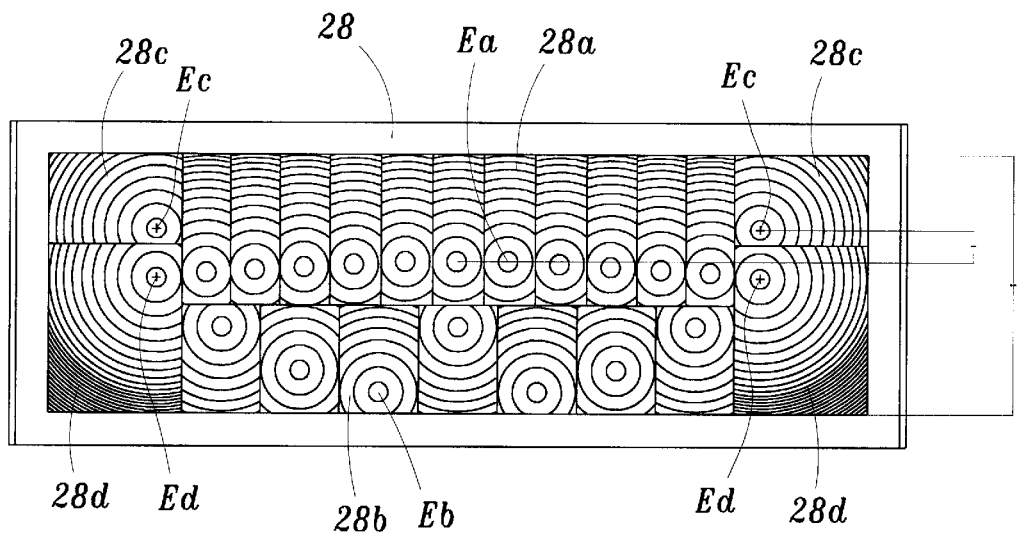
FIG. 5A is a front view of a stacked-up multifaceted arc lens assembly according to the present invention.
Figure 5B:
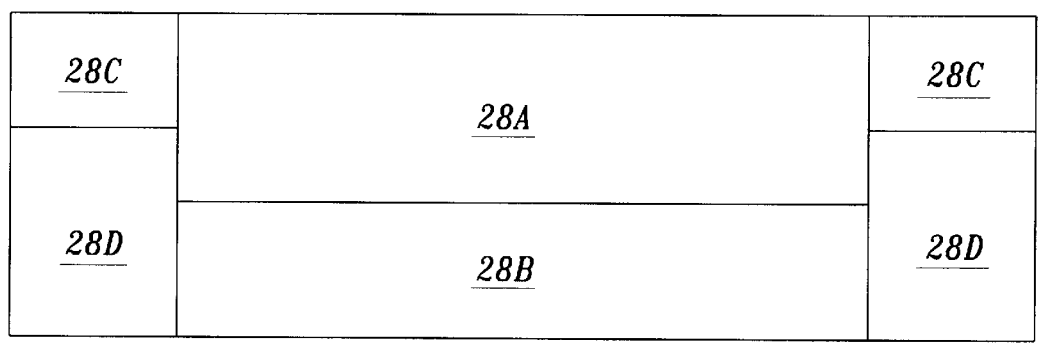
FIG. 5B is a back view of the arc lens assembly shown in FIG. 5A.

Referring to FIGS. 5A and 5B, a stacked-up multifaceted arc lens assembly 28 consists of six focusing zones marked as 28A, 28B, 28C and 28D. There are two stacked-up central focusing zones 28A, 28B and two stacked-up side focusing zones 28C, 28D at each side of the central focusing zones.

To construct two stacked-up central focusing zones 28A and 28B, a plurality of multifaceted lenses 28a and 28b, with a plurality of associated focal points Ea and Eb, are employed. These central focusing zones 28A, 28B cover a detecting range of 120 degrees, or 60 degrees from either side of the central axis of a detector element 34. The top central focusing zone 28A allows distal rays to be collected through appropriate focal points Ea and focused onto the detector element 34 directly. The bottom central focusing zone 28B allows proximal rays to be collected through appropriate focal points Eb and focused onto the detector element 34 directly.

Two stacked-up side focusing zones 28C and 28D are disposed at each side of the central focusing zones 28A and 28B. Each side focusing zone 28C or 28D comprises a broad lens 28c or 28d with an appropriate single focal point Ec or Ed respectively. The provision of a single focal point in the broad side lens is significant in the present invention, because all incident rays beyond the 120 degrees detecting range are designed to act through this point. For further elaboration, refer to FIGS. 8A to 8C, and 9A to 9C. The broad side lens 28c, 28d provides a significantly larger surface area for the collection of infrared energy. As a result, incident rays collected through the single focal point Ec or Ed will be of higher intensity and the invention thus achieves a higher optical gain. The focal point Ec is meant for distal incident rays whereas the focal point Ed is meant for proximal incident rays. The side focusing zone 28C or 28D thus focus incident infrared rays coming from an angle larger than 120 degrees at their respective focal point Ec (for lens 28c) or Ed (for lens 28d) onto the deflector plate 40 which deflects them onto the detector element 34.

Figure 6:
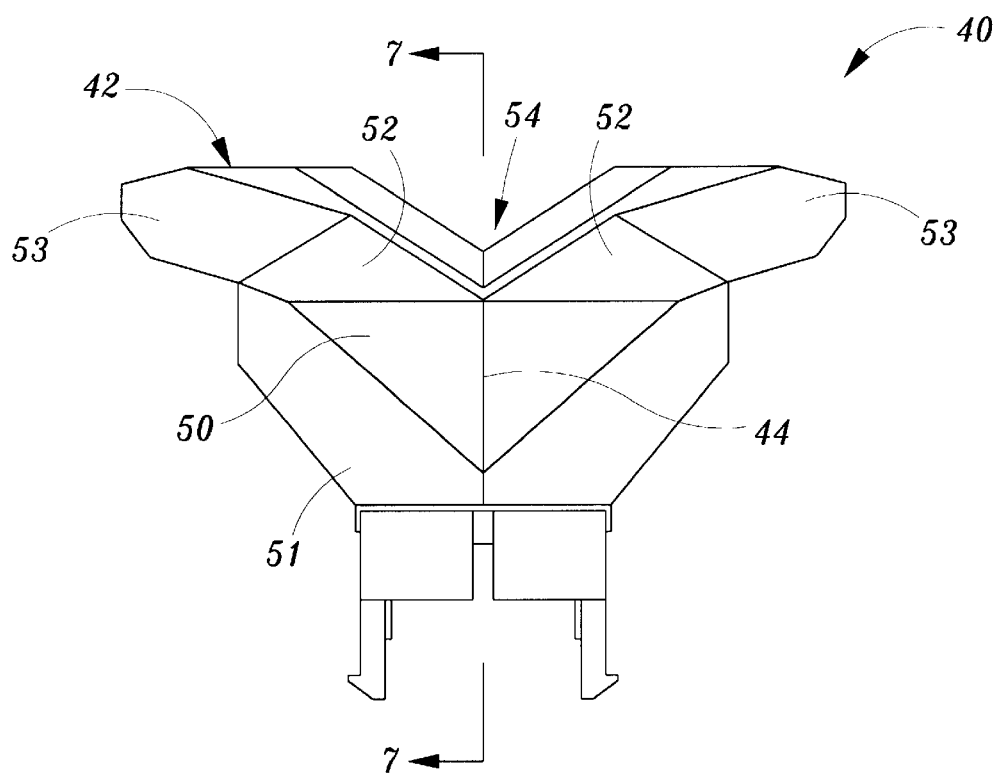
FIG. 6 is a front view of a signal deflector plate of the present invention.
Figure 7:
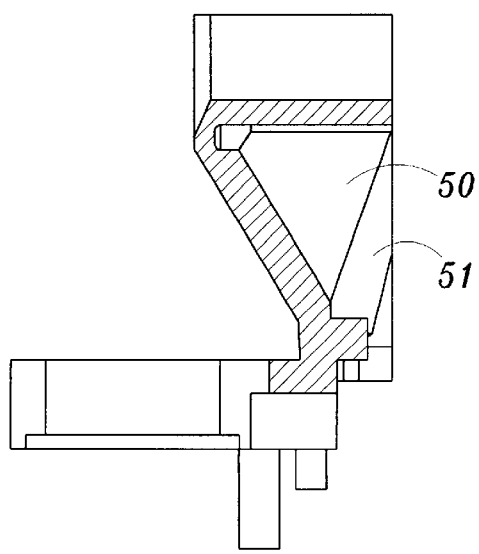
FIG. 7 is a cross-sectional view taken along line 7—7 of FIG. 6.

Referring simultaneously to FIGS. 6 and 7, a signal deflector plate 40 takes the shape of a winged configuration from the central axis of the detector element 34. It is essentially two similar reflecting units 42 symmetrically divided by an interface edge 44, the two units forming an obtuse angle. The reflecting units 42 are provided with four reflection planes 50, 51, 52, 53. The reflection plane 50 is located adjacent to the interface edge 44; the reflection plane 51 is located beneath the reflection plane 50; the reflection plane 52 is located next to the reflection plane 50. Furthermore, the end portions of the reflection planes 51 and 52 are in 25 contact with each other; and the reflection plane 53 is located next to the reflection plane 52.

All reflection planes 50 to 53 form an obtuse angle with one another, and a V-shaped notch 54 is formed between two reflecting units 42. Thus, there are four reflection planes 50 to 53 disposed on the right and left sides of the reflecting units 42. This arrangement compensates the detection blind zone that is the detecting range exceeding 60 degrees from the central axis of the detector element 34 in the right and left directions. Accordingly, the detector of the present invention has a wider detecting range than that of a conventional detector. In summary, the present invention, incorporated with the reflecting units 42 and the stacked-up multifaceted arc lens assembly 28, has a detecting range over 120 degrees.

It is important to note here that all angles mentioned in the disclosure are based on optical projections using a software such as Pro-Engineer. In real and actual applications, these angles may be slightly damped or modified because of the presence of variables such as electronic integration and the like.

Figure 8B:
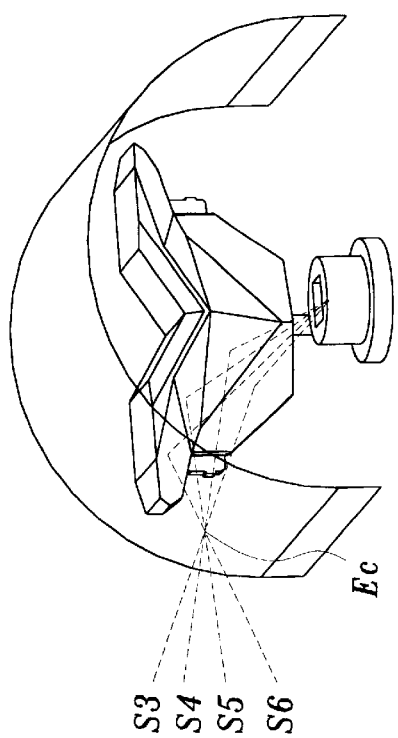
FIG. 8B shows schematically a perspective view of the present invention and incident rays as shown in FIG. 8A.
Figure 8A:
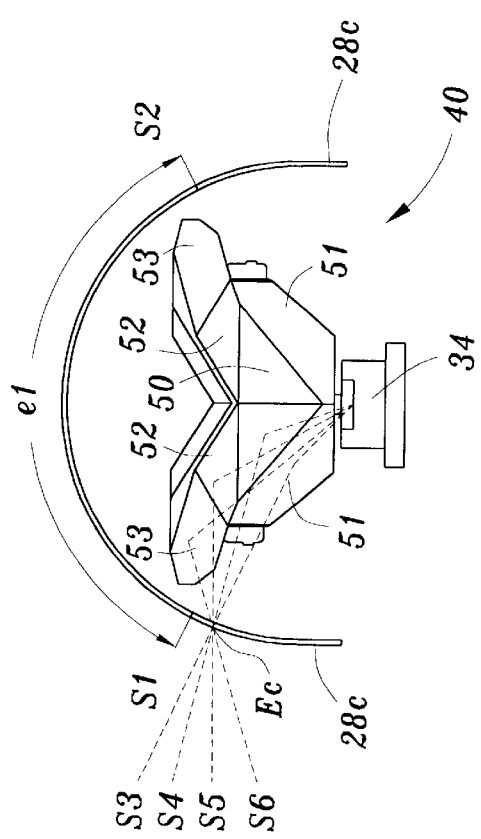
FIG. 8A shows schematically a front view of a preferred arrangement of the arc lens assembly and the deflector plate of the present invention, with incident rays passing through Ec.
Figure 8D:
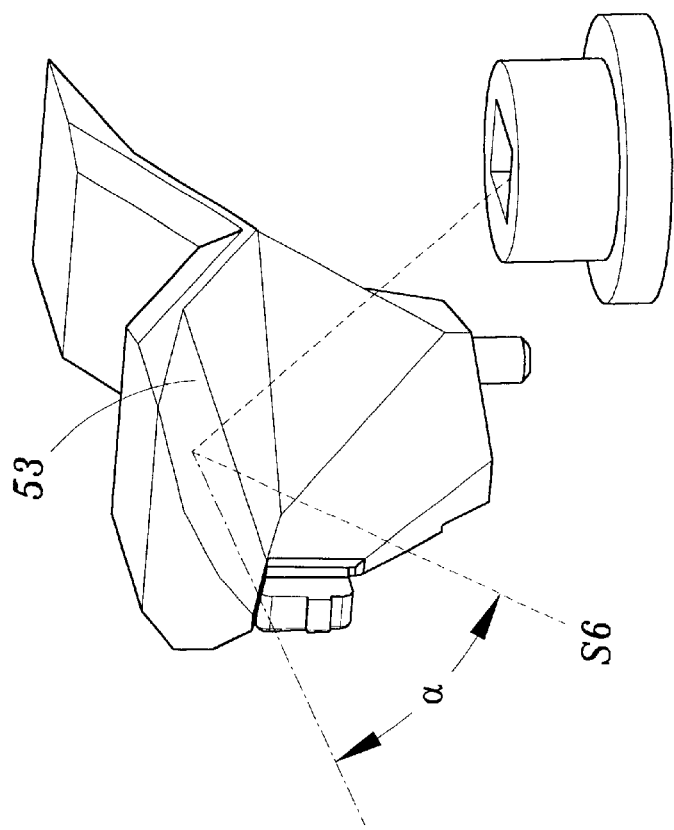
FIG. 8D shows the glancing angle for one incident ray on a reflection plane of the deflector plate.
Figure 9B:
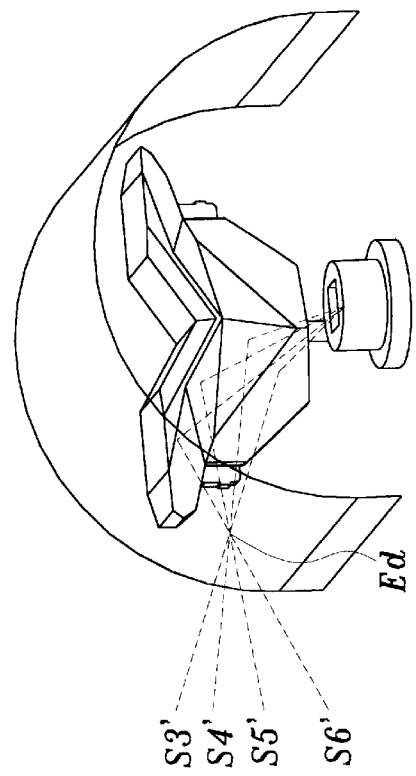
FIG. 9B shows schematically a perspective view of the present invention and incident rays as shown in FIG. 9A.
Figure 9A:
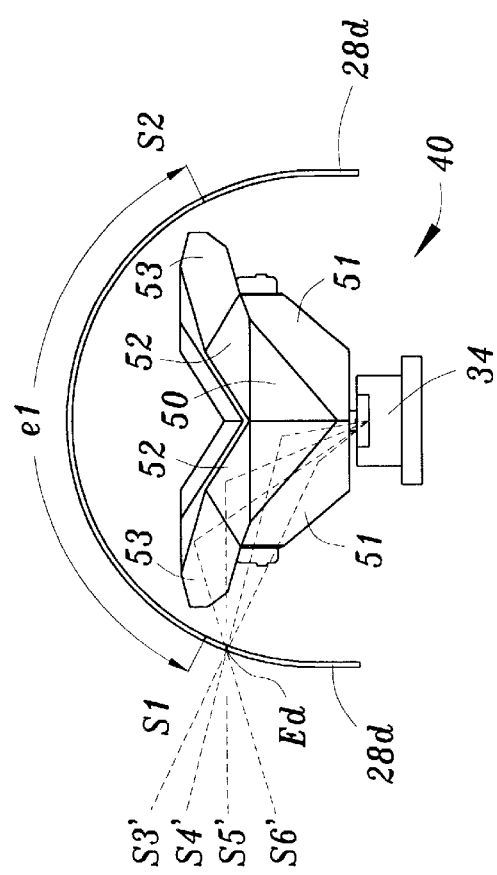
FIG. 9A shows schematically a front view of a preferred arrangement of the arc lens assembly and the deflector plate of the present invention, with incident rays passing through Ed.

As shown in FIGS. 8A, 8B, 8C and 8D, paths of distal incident rays S3, S4, S5, S6 beyond the detection range of 120 degrees are illustrated. A central detecting area for the detector element 34 is e1, whereby incident infrared rays from any angle between S1 and S2 can be directly received by the detector element 34. When incident rays are coming from beyond the central detecting area e1, the signal deflector plate 40 serves to deflect the ray to the detector element 34. For example, incident infrared rays S3 (with an angle of 64 degrees from the central axis of the detector element 34) acting through a single focal point Ec of the side lens 28c are deflected at the reflection plane 51. Incident infrared rays S4 (with an angle of 76 degrees from the central axis of the detector element 34) also acting through this single focal point Ec are deflected at the reflection plane 50. Incident infrared rays S5 (with an angle of 90 degrees from the central axis of the detector element 34) also acting through this single focal point Ec are deflected at the reflection plane 52. Incident infrared rays S6 (with an angle of 107 degrees from the central axis of the detector element 34) also acting through this single focal point Ec are deflected at the reflection plane 53. As shown in FIGS. 9A, 9B and 9C, paths of proximal incident rays S3', S4', S5', S6' beyond the detection range of 120 degrees are illustrated. A central detecting area for the detector element 34 is e1, whereby incident infrared rays from any angle between S1', and S2' can be directly received by the detector element 34 directly. When proximal incident rays are coming from beyond the central detecting area e1, the signal deflector plate 40 serves to deflect the ray to the detector element 34. For example, incident infrared rays S3' (with an angle of 64 degrees from the central axis of the detector element 34) acting through a single focal point Ed of the side lens 28d are deflected at the reflection plane 51. Incident infrared rays S4' (with an angle of 76 degrees from the central axis of the detector element 34) also acting through this single focal point Ed are deflected at the reflection plane 50. Incident infrared rays S5' (with an angle of 90 degrees from the central axis of the detector element 34) also acting through this single focal point Ed are deflected at the reflection plane 52. Incident infrared rays S6' (with an angle of 107 degrees from the central axis of the detector element 34) also acting through this single focal point Ed are deflected at the reflection plane 53.

Figure 1:
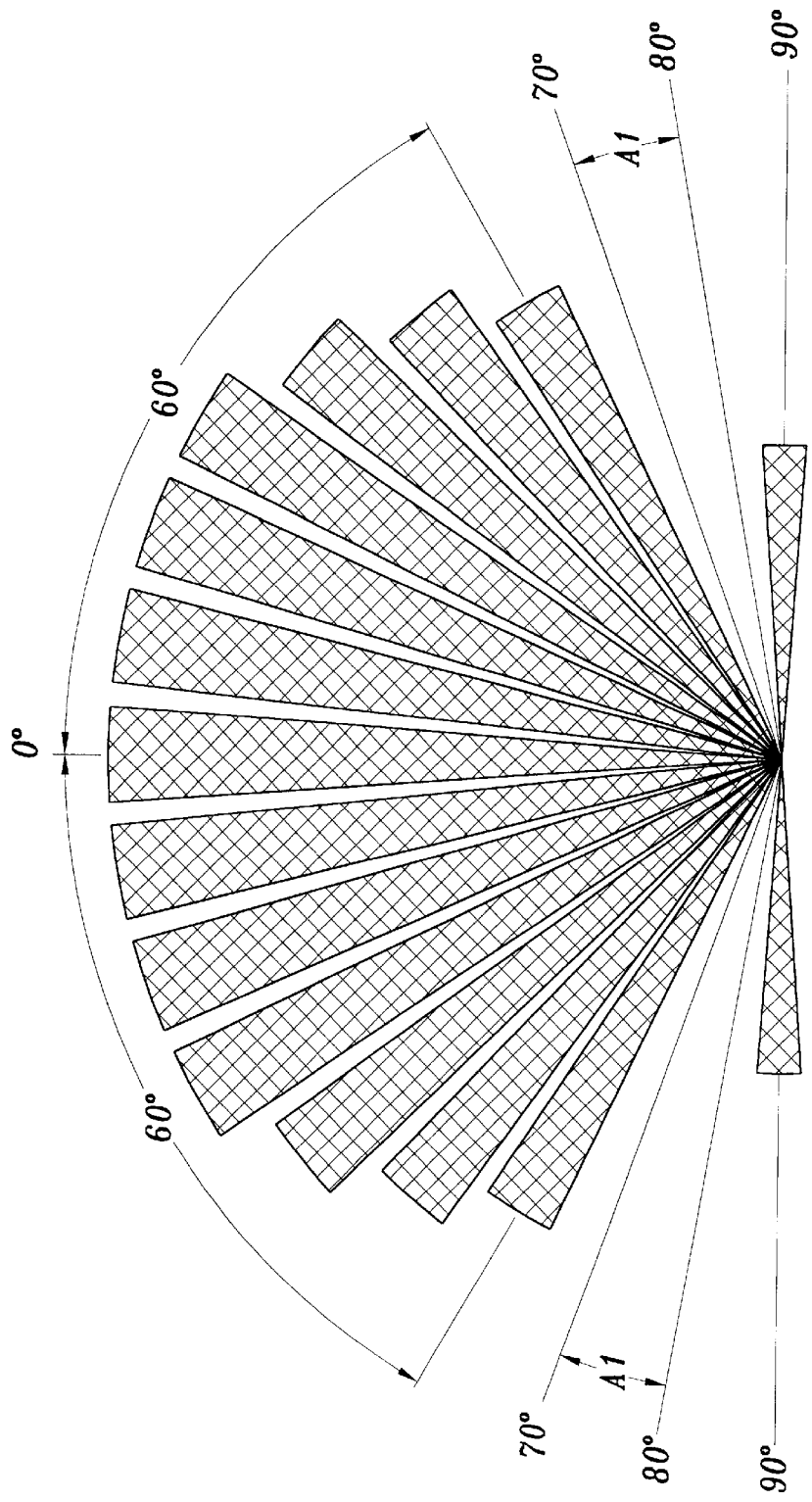
FIG. 1 illustrates a schematic view of the detecting range of a prior art detector.
Figure 10:
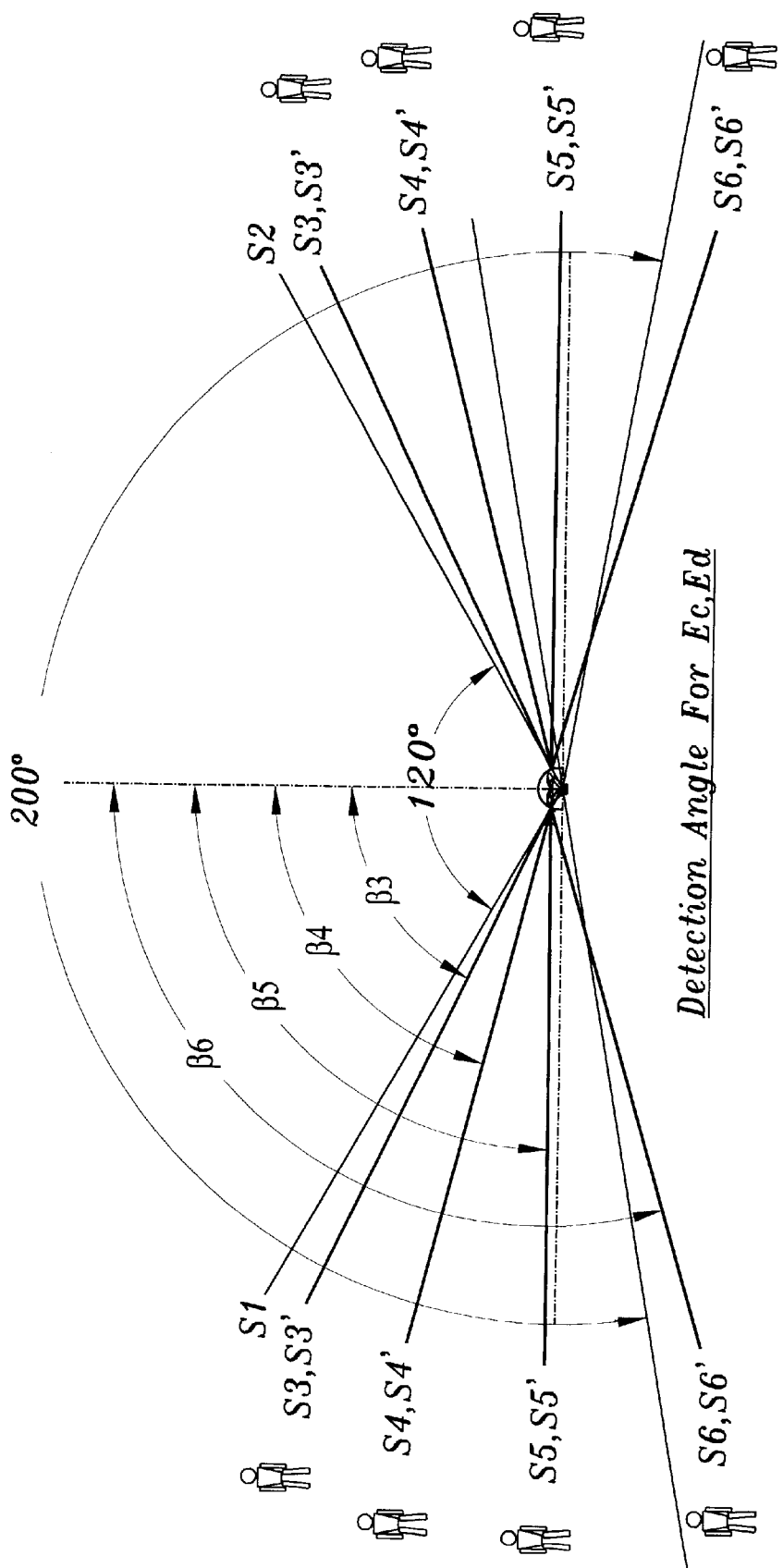
FIG. 10 shows schematically a plurality of detection angles from the central axis of detector element making up appropriate detection ranges.
Figure 11:
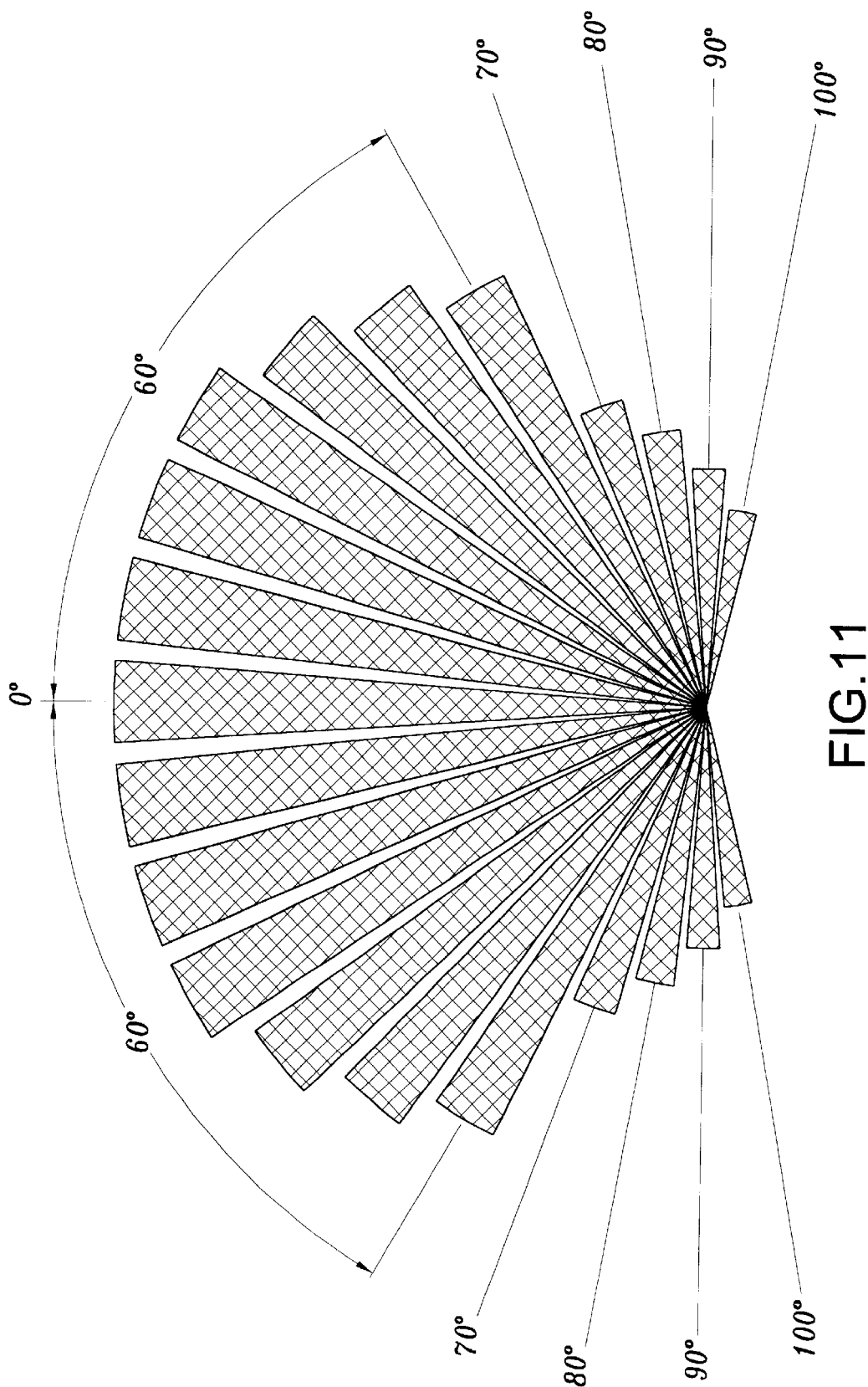
FIG. 11 illustrates a schematics view of detecting range for the invention.

As described above in the present invention, there are four reflection planes 50, 51, 52, 53, forming a winged configuration at both sides of the deflector plate 40. Glancing angle ($\alpha$) is the angle between any incident ray and the reflection planes 50, 51, 52, 53. The glancing angles ($\alpha$) of distal incident rays acting through Ea are shown in FIGS. 8C and 8D. The glancing angles (α) of proximal incident rays through Eb are shown in FIG. 9C. Based on optical projections as shown in FIG. 10, incident angles (β) are measured from the central axis of detector element 34 and remain the same for both distal and proximal rays. As shown in FIG. 11, the detecting range of the present invention is found to be wider than that of the prior art detector shown in FIG. 1. The maximum incident angle (β) mentioned in FIG. 8C or 9C is 107 degrees, equivalent to a detection range of 214 degrees.

It will be evident to those skilled in the art that the invention is not limited to the details of the foregoing description, particularly the preferred embodiment. It is therefore desired that the present invention is considered in all aspects as illustrative and not restrictive.

A method of extending the detecting range is taught by the infrared radiation which is incorporated with a stacked-up multifaceted arc lens assembly 28, comprising a plurality of centrally disposed multifaceted lens 28a, 28b making up a central focusing zone 28A, 28B and four broad side lens 28c, 28d making up a side focusing zone 28C, 28D, and a deflector plate 40, comprising a plurality of deflecting surfaces 50, 51, 52, 53 in front of a receiving detector element 34. The method comprises the steps of providing two stacked up broad side lens 28c, 28d at each side of the central focusing zone 28A, 28B; focusing distal and proximal incident infrared rays, which come from an angle more than 120 degrees from the central axis of the detector element 34, through appropriate focal points Ec, Ed of the broad side lens 28c, 28d onto the deflector plate 40; and further deflecting said rays with the assistance of appropriate deflecting surfaces 50, 51, 52, 53 of said deflector plate 40 onto the detector element 34. In the preferred embodiment, at least four deflecting surfaces 50, 51, 52, 53 are spread out from the central axis of the detector element 34 in a winged configuration on each side of the deflator plate 40, such that incident rays are deflected onto the detector element 34. It is important to note that it is possible to provide at least two deflecting surfaces on each side of the deflector plate 40.

What is claimed is:

1. An infrared radiation detector with wide detecting range comprising:
   a stationary base (10);
   a spherical body (20) mounted on said stationary base (10);
   a module of electrical circuit boards (32, 33), disposed in said spherical body (20), making up a part of a detecting and processing circuit;
   a multifaceted arc lens assembly (28) installed in front of a detector element (34), the multifaceted arc lens assembly (28) consists of six focusing zones, comprising two stacked-up central focusing zones (28A, 28B) made up of plurality of multifaceted lenses (28a, 28b) and two stacked-up side focusing zones (28C, 28D) at each side of the central focusing zones (28A, 28B) made up of lenses (28c, 28d);
   said detector element (34) located at the focus of said arc lens assembly (28); and
   a signal deflector plate (40) being conjoined to said detector element (34) and mounted on the first circuit board (32),
   the signal deflector plate (40) consists of essentially two similar reflecting units (42) symmetrically divided by an interface edge (44), and forming a V-shaped notch (54), whereas each reflecting unit (42) is provided with at least two (50, 51, 52, 53) reflection planes spread out from the central axis of the detector element (34), with all reflection planes (50 to 53) forming an obtuse angle with one another in a winged configuration,
   wherein the reflection plane (50) is located adjacent to the interface edge (44), the reflection plane (51) is located beneath the reflection plane (50); the reflection plane (52) is located next to the reflection plane (50), with the end portions of the reflection planes (51 and 52) being in contact with each other; and the reflection plane (53) is located next to the reflection plane (52).

2. The detector as in claim 1, wherein two stacked-up side focusing zones (28C and 28D) are disposed at each side of the central focusing zones (28A and 28B), and each side focusing zones (28C and 28D) comprises a board lens (28c or 28d) with an appropriate single focal point (Ec or Ed).

3. The detector as in claim 2, wherein these side focusing zones (28C or 28D) cover a detecting range selected from the group consisting of more than 120 degrees, and more than 60 degrees from either side of the central axis of the detector element (34).

4. The detector as in claim 2, wherein the focusing of distal incident infrared rays is performed by the focal point (Ea or Ec) of the lens selected from the group consisting of multifaceted lens (28a) and broad side lens (28c).

5. The detector as in claim 2, wherein the focusing of proximal incident infrared rays is performed by the focal point (Eb or Ed) of the lens selected from the group consisting of multifaceted lens (28b) and broad side lens (28d).

6. The detector as in claim 1, wherein the focusing of distal incident infrared rays is performed by the focal point (Ea or Ec of the lens selected from the group consisting of multifaceted lens (28a) and (Ec) of broad side lens (28c).

7. The detector as in claim 1, wherein the focusing of proximal incident infrared rays is performed by the focal point (Eb or Ed) of the lens selected from the group consisting of multifaceted lens (28b) and broad side lens (28d).

8. A method of extending the detecting range in an infrared radiation detector, incorporated with a stacked-up multifaceted arc lens assembly (28), comprising a plurality of centrally disposed multifaceted lens (28a, 28b) defining a central focusing zone (28A, 28B) and four broad side lens (28c, 28d) defining a side focusing zone (28C, 28D); and a deflector plate (40) having a plurality of deflecting surfaces (50, 51, 52, 53), the deflector plate (40) being connected to a front of a receiving detector element (34), comprising the steps of:
   providing two stacked broad side lens (28c, 28d) at each side of the central focusing zone (28A, 28B);
   focusing distal and proximal incident infrared rays, which come from an angle of more than 120 degrees from the central axis of the detector element (34), through appropriate focal points (Ec, Ed) of the broad side lens (28c, 28d) onto the deflector plate (40);
   providing at least four deflecting surfaces (50, 51, 52, 53) spread out from the central axis of the detector element (34) in a winged configuration on each side of the deflector elate (40), such that incident rays are deflected onto the detector element (34); and
   deflecting said rays with the assistance of appropriate deflecting surfaces (50, 51, 52, 53) of said deflector plate 40 onto the detector element (34).

9. A method of extending the detecting range in an infrared radiation detector as in claim 8 further comprising the step of providing at least two deflecting surfaces on each side of the deflector plate (40), such that the incident rays are deflected onto the detector element (34).

* * * * *